United States Patent Office 3,644,424
Patented Feb. 22, 1972

3,644,424
GLYCERYL ACETYLSALICYLATE AND ITS
ANALGESIC ANTI-INFLAMMATORY USE
Margaret H. Sherlock, Bloomfield, N.J., assignor to
Schering Corporation, Bloomfield, N.J.
No Drawing. Continuation-in-part of application Ser. No.
629,414, Apr. 10, 1967. This application Oct. 16, 1969,
Ser. No. 867,061
Int. Cl. C07d 13/04; C07c 69/84
U.S. Cl. 260—340.9
2 Claims

ABSTRACT OF THE DISCLOSURE

The invention relates to glyceryl acetylsalicylate, to its use as an analgesic anti-inflammatory agent, and to the intermediates useful in the preparation thereof. Glyceryl acetylsalicylate is prepared as follows: Heat salicylic acid and chloroacetonitrile at reflux in the presence of triethylamine and transesterify the resulting cyanomethyl salicylate with excess quantities of 2,2-dimethyl-1,3-dioxolane-4-methanol by heating in the presence of potassium carbonate to yield $\beta,\gamma$-isopropylidenedioxypropyl salicylate. Acetylate the sodium salt of $\beta,\gamma$-isopropylidenedioxypropyl salicylate and hydrolyze the resulting $\beta,\gamma$-isopropylidenedioxypropyl-o-acetoxybenzoate to yield $\beta,\gamma$-dihydroxypropyl-o-acetoxybenzoate. Alternate methods for the preparation of the desired compounds are also described.

This application is a continuation-in-part application of my co-pending application, Ser. No. 629,414, filed Apr. 10, 1967 now abandoned.

FIELD OF INVENTION

This invention relates to compositions of matter identifiable in the art of chemistry as a glyceryl ester of acetylsalicyclic acid, to the processes and intermediates useful for the preparation thereof, and to the therapeutic use of such compositions.

SUMMARY OF INVENTION

The invention sought to be patented in one of its compostion aspects resides in the concept of pharmaceutical dosage forms containing a novel compound of this invention.

The invention sought to be patented in one of its process aspects is described as residing in the concept of acetylating a cyclic acetal ester of salicyclic acid, the product of which, upon hydrolysis, will produce the desired glyceryl acetylsalicylate. In another process aspect, this invention relates to the process wherein an acyl isourea is reacted with acetylsalicyclic acid to form an alkylidenedioxypropyl ester of acetylsalicylic acid which, upon hydrolysis, is converted to the desired compound of this invention. In still another process aspect, this invention relates to the process wherein an isoureayl acetylsalicylate is subjected to a transesterification reaction with either glycerol or a cyclic acetal of glycerol to produce the desired compound of this invention.

The invention sought to be patented in its method-of-use aspect is described as residing in the concept of treating and alleviating inflammation and inflammatory conditions by administering a therapeutically effective quantity of a novel compound of this invention. Another aspect is that where a novel compound of this invention is used to cause an analgesic effect. Still another use aspect of this invention is that wherein a novel compound of this invention is used to cause an anti-pyretic effect. Another use aspect of this invention is the use of compositions which, in addition to the novel compounds of this invention, contain other active ingredients to provide desirable complementary effects when employed in the treatment of inflammatory conditions and in the treatment of pain.

DESCRIPTION OF THE PREFERRED EMBODIMENTS

A more specific representation of the compound of this invention is the chemical composition of matter having the structural formula:

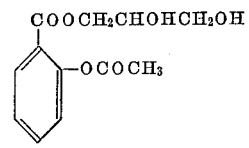

(I)

The desired glyceryl acetylsalicylate (I) of this invention may be prepared from a reactive ester of salicylic acid (e.g. cyanomethyl salicylate) by a process wherein said reactive ester is subjected to a transesterification reaction with a cyclic acetal of glycerol (e.g. 2,2-dimethyl-4-hydroxymethyl-1,3-dioxolane) to produce a cyclic acetal ester of salicylic acid which, following acetylation of the o-hydroxy radical of salicylic acid, is hydrolyzed to the desired glyceryl acetylsalicylate. The transesterification reaction is effected by heating the reactive ester of salicylic acid with a cyclic acetal of glycerol in the presence of catalytic amounts of an anhydrous alkaline catalyst, such as potassium carbonate, at temperatures in the range of about 80–250° C., although it is preferred to heat the reactants at about the reflux temperature of the reaction mixture. As the ester interchange reaction is reversible, it is preferred to employ excess quantities of the cyclic acetal of glycerol. The sequential acetylation and hydrolysis reactions of the cyclic acetal ester of salicylic acid are effected by the usual and standard techniques well known in the art.

In practice it is preferred to employ the cyanomethyl ester of salicylic acid as the reactive ester which is subjected to the transesterification reaction. However, other esters such as those wherein the cyanomethyl radical has been replaced by acyl, carbamyl, acyloxy and carbalkoxy are found to be the functional equivalents of the cyanomethyl moiety. The intermediary reactive esters are prepared by standard techniques such as by heating the salicylic acid and chloroacetonitrile at reflux temperatures in the presence of triethylamine.

The foregoing general reaction may be depicted as follows:

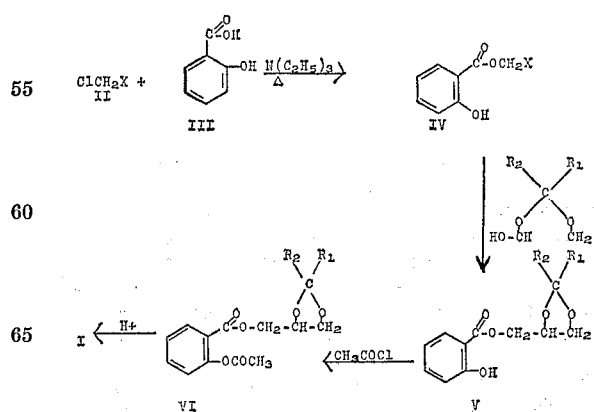

wherein X represents cyano, acyl, carbamyl, acyloxy and carbalkoxy, and $R_1$ and $R_2$ each represent a lower alkyl.

Representative of those compounds embraced by Formula II are chloroacetonitrile, chloroacetone, α-chloroacetamide, chloroacetophenone and ethyl chloroacetate, respectively.

Alternatively, the cyclic acetal esters of salicylic acid (V) may be prepared by reacting the appropriate cyclic acetal with salicylic anhydride wherein one-half molar proportions of the anhydride is caused to react with molar proportions of the cyclic acetal of glycerol according to standard procedures such as by heating the reactants in the presence of zinc chloride. Preferably, the reaction takes place in an organic solvent at about the reflux temperature of the reaction mixture. The required salicylic acid anhydride may readily be prepared by intimately contacting two molar proportions of salicylic acid with one molar proportion of the carbodiimide and permitting the reaction to occur at room temperature, although it is preferred to have the reaction take place slowly at temperatures substantially below room temperature. In practice N,N'-dicyclohexylcarbodiimide is a convenient reactant suitable for use in this reaction, but other well known equivalently functioning N,N'-disubstituted carbodiimides may also be employed. Upon completion of the reaction, the urea by-product is removed and the anhydride is ready for use without further purification.

Still another alternate method for the preparation of the desired compound of this invention is the process wherein, in the presence of pyridine, an appropriately substituted carbodiimide is reacted with acetylsalicylic acid to form an isoureayl acetylsalicylate, which ester is then reacted with either glycerol or a cyclic acetal of glycerol to produce the desired product (I) or a cyclic acetal ester of acetylsalicylic acid, respectively. The cylclic acetal ester is hydrolyzed with p-toluenesulfonic acid to produce the desired compound (I). In effecting the esterification with the carbodiimide, equimolar quantities of the reactants are stirred at below room temperatures, preferably at 0° C., using pyridine as a base solvent, although other equivalently functioning bases may similarly be used. Again, it is preferred to employ N,N'-dicyclohexylcarbodiimide, although other equivalently functioning carbodiimides may be similarly employed. The ester interchange reaction of the so-formed isoureayl acetylsalicylate with glycerol, or cyclic acetal thereof, is effected according to standard techniques such as those discussed above.

Another alternate process for the preparation of the desired compound of this invention (I) is that process wherein an alkyl isourea is reacted with acetylsalicylic acid to form an alkylidenedioxypropyl ester of acetylsalicylic acid which, upon mild hydrolysis, is converted to the desired compounds (I) of this invention. The formation of the alkyl isourea (VII) is readily effected by admixing equimolar quantities of the reactants at room temperature in the presence of catalytic quantities of cuprous chloride. In the formation of the O-($\beta$-$\gamma$-alkylidenedioxypropyl) isourea it is preferred to employ N,N'-diclohexylcarbodiimide but other equivalently-functioning carbodiimides may also be used. Similarly, 2,2-dimethyl-1,3-dioxolane-4-methanol is a preferred cyclic acetal of glycerol reactant, but other 2,2-dialkyl-1,3-dioxolane-4-methanol reactants may also be employed. The so-formed $\beta$-$\gamma$-alkylidenedioxypropyl isourea is caused to react with acetylsalicylic acid by heating the reactants at temperatures of about room temperature to about 150° C., said reaction taking place in an inert organic solvent such as dioxane. The so-formed ester is hydrolyzed by heating in the presence of p-toluene-sulfonic acid hydrate, said hydrolysis taking place in a low boiling solvent such as benzene and the like.

The following examples illustrate the preferred mode for the preparation of the compounds of this invention:

EXAMPLE I

Step A.—Cyanomethyl salicylate: To a mixture of 48 g. of salicylic acid, 200 ml. of acetone, 51 g. of triethylamine and 38 g. of chloroacetonitrile is stirred and refluxed for three hours. The excess acetone and triethylamine is evaporated and the residue treated with ice water and filtered to yield cyanomethyl salicylate, M.P. 68–70° (from benzene-pet. ether).

Step B.—$\beta$,$\gamma$-isopropylidenedioxypropyl-salicylate: A mixture of 30 g. of cyanomethyl salicylate, 135 g. of 2,2-dimethyl-1,3-dioxolane-4-methanol and 1 g. of anhydrous potassium carbonate is stirred and heated on a steam bath for two hours. The reaction mixture is poured on ice water, and filtered to yield $\beta$,$\gamma$-isopropylidenedioxypropyl salicylate.

Step C.—$\beta$,$\gamma$-isopropylidenedioxypropyl o-acetoxybenzoate: To a stirred suspension of 27.4 g. of the sodium salt of $\beta$,$\gamma$-isopropylidenedioxypropyl salicylate and 500 ml. of anhydrous ether, there is added 8 g. of acetyl chloride with cooling. The mixture is stirred for three hours at room temperature, the sodium chloride filtered, and the ethereal filtrate concentrated to dryness.

Step D.—$\beta$,$\gamma$-dihydroxypropyl o-acetoxybenzoate: The crude ketal of Step C, $\beta$,$\gamma$-isopropylidenedioxypropyl o-acetoxybenzoate, is dissolved in 250 ml. of acetone containing 10 g. of p-toluenesulfonic acid and refluxed for two hours. The excess acetone is removed in vacuo, ice water is added and the product extracted with ether, dried and concentrated to yield $\beta$,$\gamma$-dihydroxypropyl o-acetoxybenzoate.

EXAMPLE II

Step A.—O-($\beta$-$\gamma$-isopropylidenedioxypropyl)N,N' - dicyclohexyl isourea: Stir a mixture containing 33 gms. of dioxolane, 51.5 gms. of dicyclohexylcarbodiimide and 50 mgs. of cuprous chloride at room temperature for 24 hours. Dissolve the resulting mixture in 500 ml. of petroleum ether, slurry the resulting solution with alumina, filter and concentrate the filtrate to dryness.

Step B.—$\beta$-$\gamma$-isopropylidenedioxypropyl - o - acetoxybenzoate: Admix 33.9 gms. of O-($\beta$-$\gamma$-isopropylidenedioxypropyl)N,N'-dicyclohexyl isourea and 18.0 gms. of acetylsalicyclic acid in 500 ml. of dioxane and stir the mixture at 50–100° C. for four hours. Filter the resulting mixture, concentrate the filtrate to dryness and recrystallize the desired $\beta$-$\gamma$-isopropylidenedioxypropyl-o-acetoxybenzoate from isopropyl ether, M.P. 34–35° C.

Step C.—$\beta$-$\gamma$-dihydroxypropyl-o-acetoxybenzoate: Dissolve 30 gms. of $\beta$-$\gamma$-isopropylidenedioxypropyl-o-acetoxybenzoate and 10 gms. of p-toluenesulfonic acid hydrate in 250 ml. benzene and reflux the mixture for two hours. Evaporate off the excess benzene, in vacuo, add ice water and extract the product with ether. Dry and concentrate the ether extract to dryness to yield $\beta$-$\gamma$-dihydroxypropyl-o-acetoxybenzoate.

It has long been known that salicylic acid is very effective in alleviating pain and in reducing fever but that large and frequent doses thereof almost always result in nausea, often in spasms of vomiting, and sometimes even in coma. These undesirable effects were obviated to a considerable extent by using aspirin which, as is well known, is a potent effective analgesic and anti-pyretic agent. With some persons, however, even a normal dosage of aspirin causes severe gastric disturbances, and in cases wherein it is necessary to administer large doses, as with certain types of rheumatism or other diseases, severe ulceration of the gastro-intestinal tract will result. By the employment of standard laboratory techniques it is to be found that the glyceryl-acetylsalicylate (I) of this invention has exhibited a marked lessening of the ulcerogenic effect and at the same time it has not exhibited any significant decrease in its anti-pyretic analgesic or anti-inflammatory effects. Thus, the compound of this invention has significantly enhanced the functional-use indicia of aspirin.

In practice, based upon standard pharmacological studies in the rat and other animals, it has been found that chronic daily doses of 100–900 mg. of the compounds of this invention per kilogram of animal body weight will elicit the desired anti-inflammatory-analgesic effect without producing significant ulcerogenic effects, and that shortterm administration for acute conditions, the daily dosage is in the range of about 100–1200 mg./kg. of body weight. As exected, it is also to be found that in the treatment of larger animals, such as the dog, the daily dosage is in the range of about 70–900 mg. per kg. of body weight, whereas with still larger animals, such as those mammals having an adult body weight of about 70 kg., the daily oral dosage is about 50–900 mg./kg. of body weight. Of course, in all instances the optimum daily oral dosage level useful in the control of arthritic and other herein described conditions will vary depending upon the activity of the specific compound and the severity of the condition being treated and the reaction sensitivity of the patient, such as are normally determined by the attending diagnostician, it has also been found that significantly smaller doses may be administered when it is desired to effect only analgesic effects.

Significantly, the glyceryl ester of aspirin has increased the water solubility characteristic and at the same time has markedly lessened the bitter taste characteristic of aspirin. Thus, the glyceryl ester of aspirin is useful in treating pain and inflammation, especially that associated with rheumatoid and osteoporosis joint diseases, collagen disease, bursitis, gouty arthritis, spondylitis and the like. It has also been found that the cyclic acetal esters of acetylsalicylic acid and the cyclic acetal esters of salicyclic acid exhibit similar anti-inflammatory, analgesic and anti-pyretic characteristics and thus such compounds are also therapeutically useful.

It has also been found that the $\beta$-$\gamma$-alkylidenedioxypropyl acetylsalicylate intermediates (i.e., those embraced by Formula VI and which are prepared via the method of Examples I and 2) also exhibit significant anti-inflammatory-analgesic effects and therefore are also of somewhat lesser potency than their hydrolysis products and are therapeutically useful in the treatment of pain and inflammation, as well as being useful as chemical intermediates.

The compositions described herein may be administered parenterally or enterally by incorporating the composition into dosages forms such as tablets, capsules, elixirs, suspensions and the like. Representative embodiment of the formulations containing the composition of this invention are as follows:

Tablet formulations (I) Formula and method of manufacture for glyceryl acetylsalicylate

ENTERIC COATED TABLETS

Formula

| | Mg/core |
|---|---|
| Glyceryl acetylsalicylate, micronized | 100.0 |
| Citric acid | 1.0 |
| Lactose, USP | 33.5 |
| Dicalcium phosphate | 70.0 |
| Pluronic F-68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A alcohol 50 ml./1000 cores. | |
| Corn starch | 30.0 |
| Dry: | |
|     Sodium lauryl sulfate | 3.0 |
|     Magnesium stearate | 3.0 |
| Tablet weight | 350.0 |

Procedure

The glyceryl acetylsalicylate is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, Carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen, add sodium lauryl sulfate and magnesium sulfate, mix and compress into desired shape on a tablet machine.

Pluronic F–68 is a U.S. registered trademark for non-ionic surface-active agent prepared by the addition of ethylene oxide to a polypropylene glycol which has a molecular weight of 1750.

Coating

The above cores are treated with a lacquer and dusted with talc to prevent moisture adsorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

(II) Capsule formulations

Formula

| | Mg./capsule |
|---|---|
| Glyceryl acetylsalicylate, micronized | 100.00 |
| Citric acid | 1.00 |
| Pluronic, F–68 | 40.00 |
| Sodium lauryl sulfate | 20.00 |
| Lactose | 238.00 |
| Magnesium stearate | 101.00 |
| | 400.00 |

Procedure

Mix together glyceryl acetylsalicylate, citric acid, pluronic, sodium lauryl sulfate and lactose. Pass through a No. 80 screen. Add magnesium stearate, mix and encapsulate into the proper size 2 piece gelatin capsule.

(III) Oral suspension

Formula

| | Mg./5 ml. |
|---|---|
| Glyceryl acetylsalicylate, micronized | 100.0 |
| Veegum, Vanderbilt | 50.0 |
| Standard granulated sugar, USP | 2500.0 |
| Sorbitol solution, USP | 1250.0 |
| Sodium saccharin, NF | 50.0 |
| Sodium benzoate, USP | 5.0 |
| Ethanol, USP, 0.025 ml. | |
| Menthol, USP | 1.000 |
| Flavor q.s. | |
| Purified water, USP, to make 5 ml. | |

Method of preparation

Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the glyceryl acetylsalicylate with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform. Veegum Vanderbilt is an inorganic complex colloidal magnesium aluminum silicate.

(IV) Suppository

Formula

| | Mg./2 gms. |
|---|---|
| Glyceryl acetylsalicylate, micronized | 100 |
| Theobroma oil, pharm. grade to make 2 gms. | |

Method of preparation

Prepare a slurry of the glyceryl acetylsalicylate with a portion of the melted theobroma oil and pass the slurry through a suitable colloid mill until it is free of grittiness. Add sufficient melted theobroma oil to bring the batch to final weight. Pour the melted mix, while maintaining uniformity, into appropriately prepared molds and allow to cool.

(V) Topical ointment

Formula

| | Mg./gm. |
|---|---|
| Glyceryl acetylsalicylate, micronized | 20.0 |
| Methylparaben, USP | 0.5 |
| Propylparaben, USP | 0.1 |
| Petrolatum, USP, to make 1 gm. | |

Method of manufacture

Dissolve the parabens in the melted petrolatum. Prepare a slurry of the glyceryl acetylsalicylate with a portion of the paraben solution. Pass the slurry through a suitable colloid mill until free of grittiness. Add the slurry to the remainder of the paraben solution and mix while cooling to room temperature.

I claim:

1. A compound of the group having the structural formula:

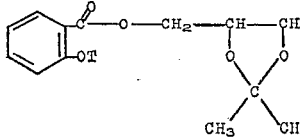

wherein T is a member of the group consisting of H, COCH$_3$ and alkali metal.

2. A compound of claim 1 wherein T is —COCH$_3$, said compound being β,γ-isopropylidenedioxypropyl-o-acetoxybenzoate.

References Cited

UNITED STATES PATENTS

| 882,590 | 3/1908 | Sorger | 260—474 |
|---|---|---|---|
| 2,070,240 | 2/1937 | Ruben | 260—474 |
| 3,232,944 | 2/1966 | André Allais et al. | 260—340.9 X |
| 3,413,313 | 11/1968 | Scherrer | 260—340.9 |
| 3,432,524 | 3/1969 | Linden | 260—340.9 |
| 3,478,048 | 11/1969 | Edenhofer et al. | 260—340.9 X |
| 3,484,446 | 12/1969 | Biel et al. | 260—340.9 X |

ALEX MAZEL, Primary Examiner

J. H. TURNIPSEED, Assistant Examiner

U.S. Cl. X.R.

260—465, 474; 424—278, 308